Aug. 23, 1966 R. E. HILL 3,267,573
SHOCK ABSORBER
Filed May 26, 1964 2 Sheets-Sheet 1
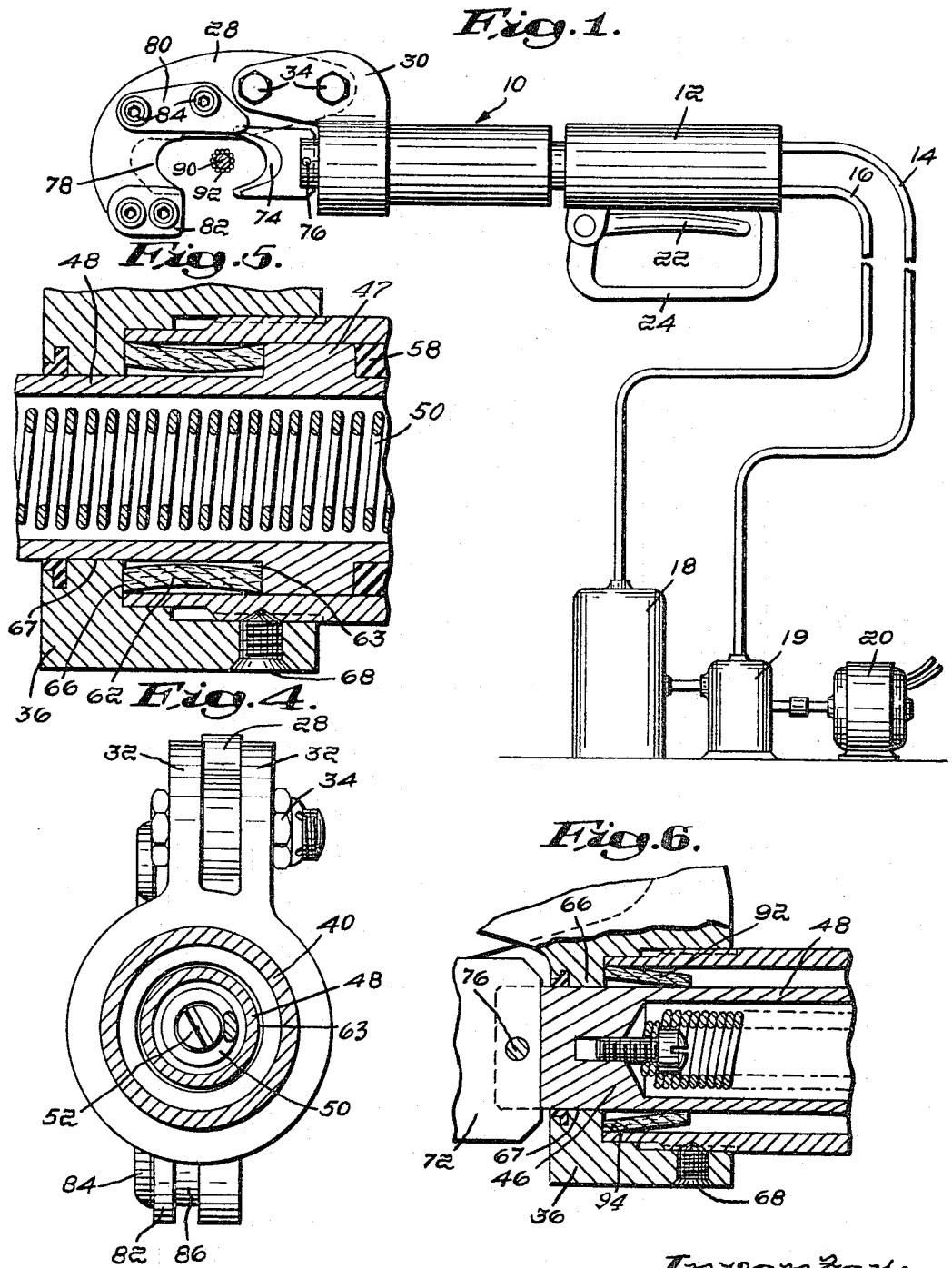
Inventor:
Rowland E. Hill,
by Russell, Chittick & Pfund
Attorneys

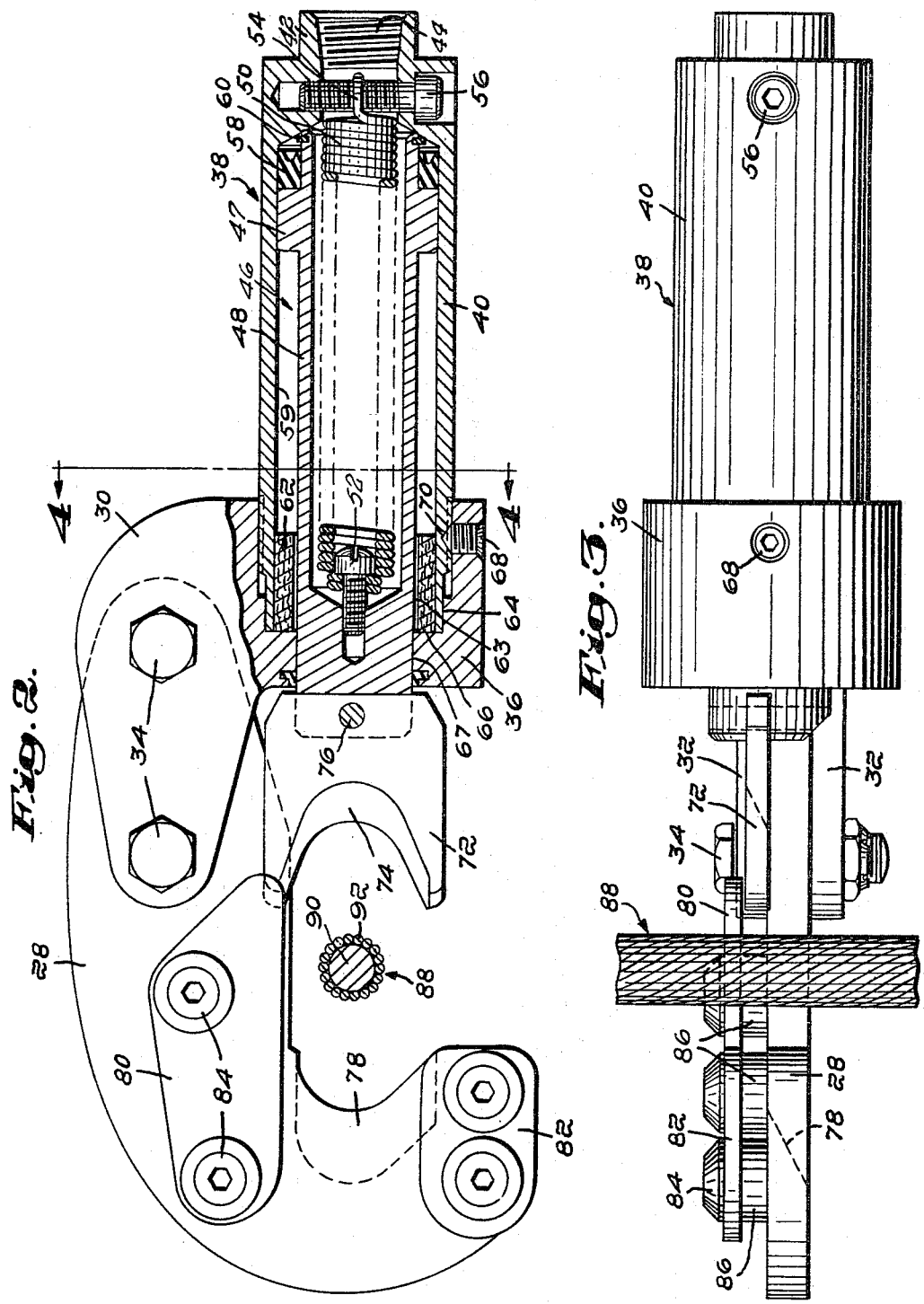

United States Patent Office 3,267,573
Patented August 23, 1966

3,267,573
SHOCK ABSORBER
Rowland E. Hill, Stoneham, Mass., assignor to H. K. Porter, Inc., Somerville, Mass., a corporation of Massachusetts
Filed May 26, 1964, Ser. No. 370,200
2 Claims. (Cl. 30—228)

This invention relates generally to cutting or stamping tools and more particularly to an approved shock absorbing means for use with hydraulically or pneumatically powered apparatus of the aforementioned type.

Although reference will hereinafter be made to a hydraulically operated cutting tool in describing the applicant's invention, it is to be understood that the invention is capable of being utilized with either hydraulically or pneumatically powered tools employing pistons to force a blade or die through a workpiece.

Piston operated cutting tools are widely utilized in various industrial applications. In apparatus of this general class, the workpiece is first positioned adjacent a movable cutting blade mounted on the end of the piston for movement therewith. The movable blade may be opposed by another fixed blade or in the alternative by a blade stop, depending on the particular design of the tool. The movable blade is then advanced and forced through the workpiece towards the opposed stationary blade or stop to perform the cutting operation.

The means for advancing the movable blade through the workpiece may again vary with the particular design of the tool and the material being cut. In hydraulically operated cutting tools, however, the movable blade is usually fixed to the end of a hydraulic piston.

Although apparatus of this type has proved generally satisfactory, difficulties have been encountered in providing a tool capable of successfully undergoing long periods of continuous use without failing prematurely. To explain, as each cutting operation commences, the piston pressure required to advance the movable blade through the workpiece rapidly increases and continues to do so until the stock is ultimately severed. When the cut is completed and resistance to the forward motion of the blade removed, the blade suddenly jumps forward to strike the opposed fixed blade or stop. This imparts a shock to the entire tool and often results in structural failures after relatively short periods of usage.

The aforementioned difficulty is compounded when cutting high tension power distribution cables. These cables are usually constructed with an inner steel core of high tensile strength surrounded by individual wire conductors of a more maleable substance such as aluminum. When cutting cables of this type with conventional piston-operated tools, the following sequence has been observed: as the movable blade begins to cut the outer layer of maleable wire conductors, the pneumatic or hydraulic pressure required to advance the piston increases gradually. However, as soon as the steel core is contacted, piston pressure increases sharply due to the increased resistance encountered by the blade. This sharp rise in pressure continues until the central core is sheared, often reaching pressures as high as 6,000 p.s.i. When shearing finally does occur, the movable blade and piston suddenly jump forward until finally stopped by the opposed stationary portion of the tool. This in turn results in a considerable shock being imparted to the tool structure at the termination of each cutting cycle. Experience has shown that when utilized under these conditions, cutting tools often fail prematurely, requiring expensive repairs and in some cases, complete replacement.

Various attempts at alleviating these difficulties have been made in the past. One such attempt comprised the positioning of metering orifices between the source of pressurized hydraulic fluid and the piston in order to retard any sudden forward motion of the cutting blade following the completion of cut. Although the shock imparted to the tool structure was to some degree lessened by this modification, the overall effectiveness of this arrangement was found to be lacking, primarily because the metering orifices reduced hydraulic fluid flow and thus prolonged each operating cycle.

It is therefore an object of the present invention to provide an improved means for arresting the forward piston motion of hydraulic or pneumatic tools following completion of a cutting or punching operation.

Another object of the present invention is to provide a low cost means of absorbing shocks imparted to the frame structure of hydraulically or pneumatically operated tools.

Another object of the present invention is to provide a tool embodying an improved means of arresting the forward motion of a piston mounted blade or die without a resulting increase in the total time required to complete a cycle of operation.

A further object of the present invention is to provide a hydraulically-operated cutting tool having a shock absorbing means positioned intermediate the piston and an opposed stationary portion of the tool structure.

These and other objects of the present invention will become more apparent as the description proceeds with the aid of the accompanying drawings in which:

FIG. 1 is a general illustration on a reduced scale of a cutting tool embodying the present invention, the said tool being operatively connected to a conventional hydraulic pump and motor;

FIG. 2 is an enlarged view in partial vertical section of the hydraulically powered cutting tool illustrated in FIG. 1 with the hand-operated valve disconnected therefrom;

FIG. 3 is a bottom plan view of FIG. 2;

FIG. 4 is a sectional view taken along line 4—4 of FIG. 2;

FIG. 5 is an enlarged sectional view showing the shock absorber in a deformed condition following advancement of the piston; and FIG. 6 is a partial sectional view similar to FIG. 2 illustrating an alternate embodiment of the invention.

Referring initially to FIG. 1 wherein are best illustrated the general features of a tool embodying the present invention, a hydraulically-operated cutting tool generally indicated by the reference numeral 10 is shown having attached thereto a hand-operated control valve 12 of conventional design. Valve 12 controls the flow of hydraulic fluid through flexible feed and return lines 14 and 16 which provide a connection between the cutting tool 10 and a remote source of pressurized hydraulic fluid herein shown comprising a tank 18, pump 19 and motor 20. Control valve 12 is further provided with a pivotally mounted operating handle 22 surrounded by a safety guard 24, the latter serving as a means of avoiding accidental actuation of the cutting tool.

As can be best seen in FIGS. 2 and 3, hydraulically-operated cutting tool 10 is provided with a two-part head assembly including front and rear link members 28 and 30. The upper portion of rear link member 30 is provided with spaced parallel arms 32 forming a bifurcated section within which the front link member 28 is inserted and held rigidly in place by cross bolt and nut arrangement 34. The lower portion of rear link member 30 is formed into an enlarged integrally fabricated annular collar 36 to which is attached a hydraulic linear actuator generally indicated by the reference numeral 38.

The linear actuator is comprised basically of an outer tubular cylinder 40 terminating at its rear end in a reduced diameter portion 42 having a threaded port 44 extending therethrough. A hollow piston member 46 having a radial shoulder 47, a reduced diameter portion 48 and containing an elongated piston return spring 50 is axially inserted within tubular cylinder 40. The front end of spring 50 terminates in a small diameter ring (see FIG. 4) which is attached to the forward portion of piston member 46 by a screw 52 threaded within a suitably disposed aperture in the piston head. The rear portion of the spring terminates in a loop 54 held in place by a transversely disposed screw 56 threaded through the walls of cylinder 40. An annular hydraulic fluid seal 58 is further provided between piston 46 and the inner wall 59 of cylinder 40. The seal is held in place on the piston by the combined retaining action of shoulder 47 and a snap ring 60.

Once piston 46 has been inserted within tubular cylinder 40, assembly of the hydraulic linear actuator 38 is completed by positioning a shock absorbing member 62 between the reduced diameter portion 48 of piston 46 and inner cylinder wall 59. For purposes of illustration, shock absorbing member 62 has been illustrated in FIG. 2 in the form of a relatively thick deformable elastomer cylinder. The outer wall of cylindrical shock absorbing member 62 fits tightly against the inner wall 59 of cylinder 40. In contrast, its inner wall is spaced from the reduced diameter portion of the piston to provide an annular passageway 63 therebetween. It should of course be understood that the structure and material utilized in forming the shock absorbing element can be varied, as for example by axially aligning a plurality of annular metal or rubber washers, without departing from the spirit and scope of the invention.

The completely assembled hydraulic linear actuator 38 is then attached to rear link member 30 by inserting the forward portion of tubular cylinder 40 within a suitably dimensioned passageway 64 extending into annular collar 36. Passageway 64 terminates in an inwardly disposed shoulder 66 against which the end of the tubular cylinder 40 abuts. Shoulder 66 is in turn provided with a reduced diameter passageway 67 through which the forward end of piston member 46 extends. Once inserted within passageway 64, tubular cylinder 40 is locked in place by a lock screw 68 which extends through a threaded aperture in collar 36 into an aligned indentation 70 in the outer cylinder wall.

A blade member 72 having a curved sharpened edge 74 is then fixed to the exposed end of piston 46 by means of a retaining pin 76. With this construction, blade 72 hereinafter referred to as the "movable blade," is positioned for movement in conjunction with the axial displacement of piston 46.

Movable blade 72 is herein shown opposed by a fixed blade 78 comprising a concave sharpened portion of front link member 28. As can be best seen in FIG. 3, the movable blade 72 is arranged to slide past fixed blade 78 and is guided in this path by upper and lower blade guides 80 and 82. The blade guides are fixed to the front link member 28 by means of screws indicated typically by the reference numeral 84 and are held in spaced relationship therefrom by means of relatively thin annular spacer elements 86.

Having thus described the principal components of the applicant's apparatus, its operation will now be described. Control valve 12 having flexible hydraulic feed and return lines 14 and 16 attached thereto is first connected through threaded port 44 to the hydraulically-operated cutting tool 10. The lines are flexible, relatively light in weight and of considerable length, thereby providing an operator with ample freedom of movement. With the tool connected to a pressurized source of hydraulic fluid, the cutting operation may be commenced.

The workpiece to be severed, herein shown for purposes of illustration in the form of a high tension power distribution cable 88 is first positioned between the fixed and movable blades 78 and 72 as indicated in FIGS. 2 and 3. Handle 22 is then depressed by the operator in order to introduce pressurized hydraulic fluid through port 44 into the interior of piston member 46. As the pressure builds up, the tension of piston return spring 48 is overcome and piston 46 carrying movable blade 72 is axially displaced within cylinder 40 towards fixed blade 78. This will of course eventually result in the workpiece 88 being pushed to the left as viewed in the drawings until it is engaged by both blades.

In a workpiece 88 of the type shown in the drawings, a central core 90 of high tensile strength material such as steel is surrounded by a plurality of relatively soft conductor elements indicated typically at 92. As the blades 72 and 78 engage the workpiece and begin cutting through the conductor elements 92, the hydraulic pressure required to advance piston 46 begins to gradually increase. This relationship will continue until the central core 90 is contacted, at which time the hydraulic pressure will increase rapidly due to the greater resistance encountered by the blades. Experiments have shown that in severing cables of this type, maximum hydraulic pressures in excess of 6,000 p.s.i. are often required.

As soon as the core 90 is severed, all resistance offered by the cable to the forward motion of movable blade 72 is instantaneously lost. As a result of this sudden cessation of resistance at a point when the piston 46 is under maximum hydraulic pressure, piston 46 carrying movable blade 72 jumps forward towards fixed blade 78 at a tremendously accelerated rate of speed. In tools of past design, the forward motion of movable blade 72 would be stopped when a portion of the piston contacted an opposed stationary portion of the tool. As previously mentioned, this inevitably caused premature failure of structural components.

The present invention obviates this difficulty by positioning shock absorbing element 62 between piston 46 and the inwardly disposed annular shoulder 66 of collar 36. As shown in FIGURE 5, when piston 46 jumps forward following completion of the cutting operation, its shoulder 47 immediately engages shock absorber 62. This in turn results in the shock absorber being deformed as illustrated. It is to be understood that the annular space 63 between the shock absorber's inner wall and the reduced diameter portion 48 of the piston plays an important part in the overall shock absorbing function. More particularly, since most of the materials utilized in fabricating shock absorbers are relatively incompressible, space must be provided for deformation. Otherwise, the shock absorber would present a solid obstruction to the forward motion of the piston, serving only as a means of transmitting shocks to the associated tool components.

Once the workpiece 88 has been separated, the operator releases handle 22. This resets control valve 12 and places port 44 in communication with return line 16. Piston return spring 48, which had previously been extended by the forward motion of the piston, then returns the piston to its withdrawn position within cylinder 40 and readies the tool for another cutting cycle.

Referring now to FIG. 6, an alternate embodiment of the applicant's shock absorbing member indicated by the reference numeral 92 is shown positioned between the reduced diameter portion 48 of piston 46 and the inner wall 59 of cylinder 40. Member 92 is comprised of a hollow truncated conical wall surrounding piston 46 with its enlarged base portion 94 abutting shoulder 66. When engaged by the forward motion of the piston during operation of the tool, the base portion 94 of shock absorbing member 92 has a tendency to "flare out" due to its peculiar construction. This has been found advantageous since it reduces any possibility of damaging the shock absorber by forcing it between collar 36 and piston 46 through passageway 67.

Having thus described both the construction and operation of the applicant's apparatus, it can readily be appreciated that the inventive concepts included herein may also be applied to pneumatically actuated piston-operated tools.

It is my intention to cover all changes and modifications of the invention herein chosen for purposes of disclosure which do not depart from the spirit and scope of the invention.

I claim:

1. Apparatus for forcing a tool through a workpiece comprising the combination of: a tubular actuating cylinder having an extensible piston slidably contained therein, said piston provided with a reduced diameter portion spaced from the inner wall of said cylinder to provide an annular chamber therebetween; a collar member fixed to the end of said cylinder, said collar member having a passageway extending therethrough in axial alignment with said cylinder, the reduced diameter portion of said piston slidably extending through said passageway with said tool mounted on the end thereof; fixed retaining means associated with said collar, said retaining means spaced from and oppositely disposed to said tool; means for advancing said piston in order to force said tool through a workpiece positioned between said tool and said fixed retaining means; stop and shock absorbing means positioned within said annular chamber for gradually stopping further motion of said piston following passage of said tool through said workpiece, said stop and shock absorbing means comprising a resilient tubular member having its outer cylindrical surface fitted tightly against the inner cylinder wall, the inner cylindrical surface of said tubular member being spaced radially from the reduced diameter portion of said piston to provide an annular passageway into which said tubular member is allowed to deform under impact from said piston; and means for subsequently retracting said piston within said cylinder.

2. The apparatus as set forth in claim 1 wherein said stop and shock absorbing means is comprised of a deformable sleeve member with an enlarged diameter portion at one end tapering gradually to a reduced diameter portion at the other end, the outer edge of said sleeve member at said one end being wedged tightly against the inner cylinder wall and the inner edge of said sleeve member at said other end being in slidable contact with the reduced diameter portion of said piston, there being provided between said reduced diameter portion of said piston and the inner surface of said sleeve member a tapering annular passageway into which said sleeve member is allowed to deform when contacted by said piston.

References Cited by the Examiner

UNITED STATES PATENTS

| 2,543,109 | 2/1951 | Holowka | 30—228 |
| 2,612,140 | 9/1952 | Miller | 30—228 X |
| 2,814,873 | 12/1957 | Prowse | 30—228 |
| 3,010,430 | 11/1961 | Allen et al. | 227—130 X |
| 3,091,768 | 6/1963 | Whitney | 227—130 X |

FOREIGN PATENTS

| 647,934 | 12/1950 | Great Britain. |

WILLIAM FELDMAN, *Primary Examiner.*

J. C. PETERS, *Assistant Examiner.*